Figure 1:
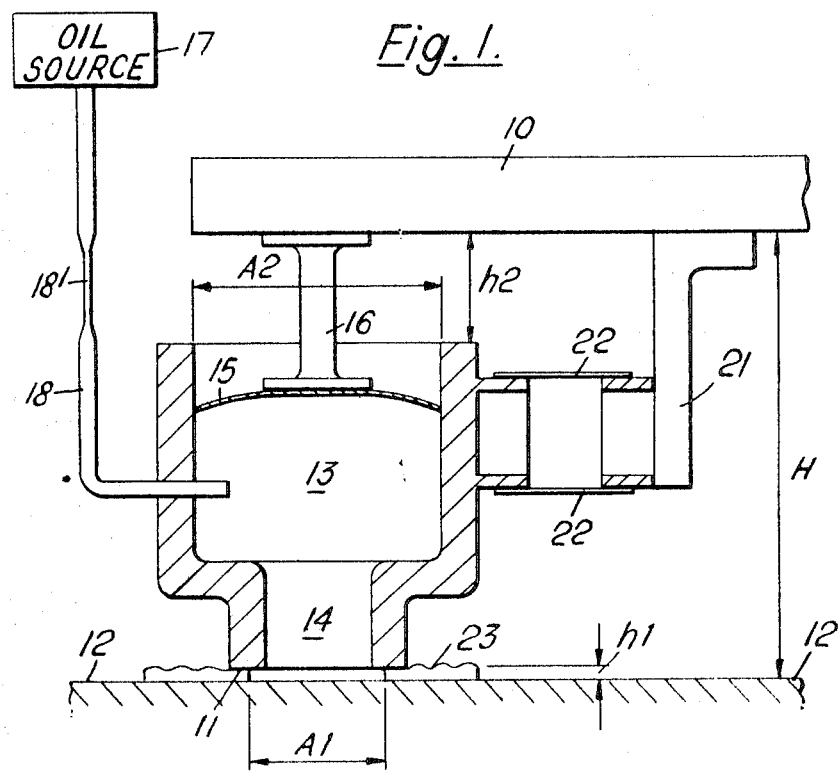

United States Patent

[11] 3,597,020

| [72] | Inventor | Graham Isaac Thomas<br>Lennox Row, Edinburgh, Scotland |
|---|---|---|
| [21] | Appl. No. | 805,167 |
| [22] | Filed | Mar. 7, 1969 |
| [45] | Patented | Aug. 3, 1971 |
| [73] | Assignee | Ferranti, Limited Hollinwood, England |
| [32] | Priority | Mar. 9, 1968 |
| [33] | | Great Britain |
| [31] | | 11,632/68 |

[54] PRESSURE-LUBRICATED BEARINGS
6 Claims, 5 Drawing Figs.

[52] U.S. Cl. .................................................. 308/5 R, 184/5
[51] Int. Cl. ..................................................... F16c 33/10
[50] Field of Search ............................................ 308/5, 9, 122, 5 R; 184/5

[56] References Cited
UNITED STATES PATENTS
3,137,530  6/1964  Kohler .......................... 308/5
3,260,162  7/1966  Atherton ....................... 184/5 X
3,271,086  9/1966  Deffrenne ...................... 308/5

FOREIGN PATENTS
985,642  3/1965  Great Britain ................ 308/9

*Primary Examiner*—Manuel A. Antonakas
*Attorney*—Cameron, Kerkam & Sutton

ABSTRACT: A pressure-lubricated bearing to allow a sliding movement of a load over a fixed planar bearing surface while keeping substantially constant the height of the load above that surface over a wide range load weights includes a chamber filled with oil under pressure from a source and sealed at the top by an elastic diaphragm which supports the load. The other end contains a port through which a bearing film of oil escapes between the chamber and the planar surface. An increase in load weight reduces the film thickness; but the resulting increase of the oil pressure in the chamber displaces the diaphragm (and hence the load) upwards to compensate. Similarly with decreases of load weight.

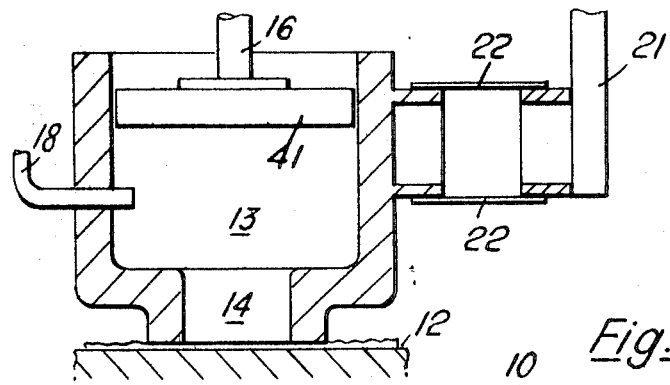
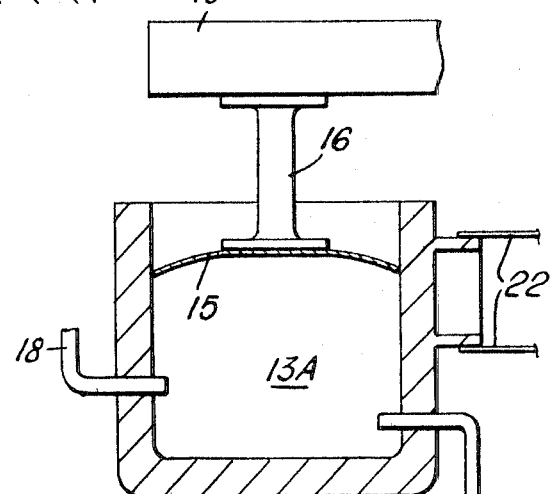
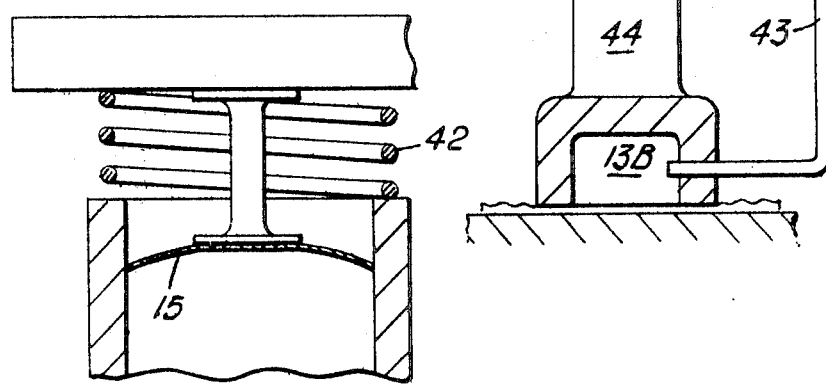

PRESSURE-LUBRICATED BEARINGS

This invention relates to pressure-lubricated bearings to support a load or resist a thrust due to a load.

The load may for example be the workable of a machine tool; or it may be the cutter or other part of the tool, the load being here of a dynamic nature. The load may also be a movable gantry which carries the probe of an inspection machine; as in such an arrangement the distribution of the weight of the gantry between the bearings at the end of it may vary appreciably as the probe carriage traverses the gantry. The term "load" as used hereinafter should accordingly be interpreted in a wide sense to include any structure by which a weight is imposed on the bearing.

It should of course be understood that the invention is not restricted to the particular application described in the preceding paragraph.

In such a pressure-lubricated bearing, oil or other lubricating fluid, which may be air, is maintained under pressure in a recess or chamber which has an orifice opening towards a first bearing surface. The orifice is surrounded by a second bearing surface between which and the first bearing surface the oil escapes as a thin film to a region of atmospheric pressure. The load is mainly supported by the reaction of the pressurized oil on that part of the first surface under the orifice, the second surface and cooperating part of the first surface being provided mainly to restrict sufficiently the rate at which the oil escapes.

Where one of the earing surfaces is attached to the load and the other to some reference structure, the distance between which and the load is to be kept constant to a high degree of accuracy, such a bearing has the disadvantage that the thickness of the oil film escaping between the bearing surfaces will vary with the weight of the load, or the thrust exerted by the load, as the case may be, and thereby render the distance between the load and the reference structure not constant.

An object of the present invention is accordingly to provide a pressure-lubricated bearing which is to large extent free from that disadvantage.

In accordance with the present invention, a pressure-lubricated bearing to support a load or resist a thrust due to a load includes a first and second cooperating bearing surfaces attached respectively to the load and to a reference structure and having a common area of overlap, a pressure chamber located between the second surface and the load and having a port which opens in the first surface in said common area, the chamber being sealed remote from the port over an area larger than that of said common area by a member movable to accept variations in the internal volume of the chamber, means rigidly coupling he load to said movable member, a source for continuously delivering fluid under pressure to the chamber by way of a fluid resistance, thereby providing in operation a pressure reaction at said port and a film of fluid escaping from said port between said surfaces, and resilient means coupling the chamber to the load to compensate for variations in the thickness of said film by oppositely varying the distance between the chamber and the load to maintain the distance between the load and the second surface substantially constant.

Figure 2:
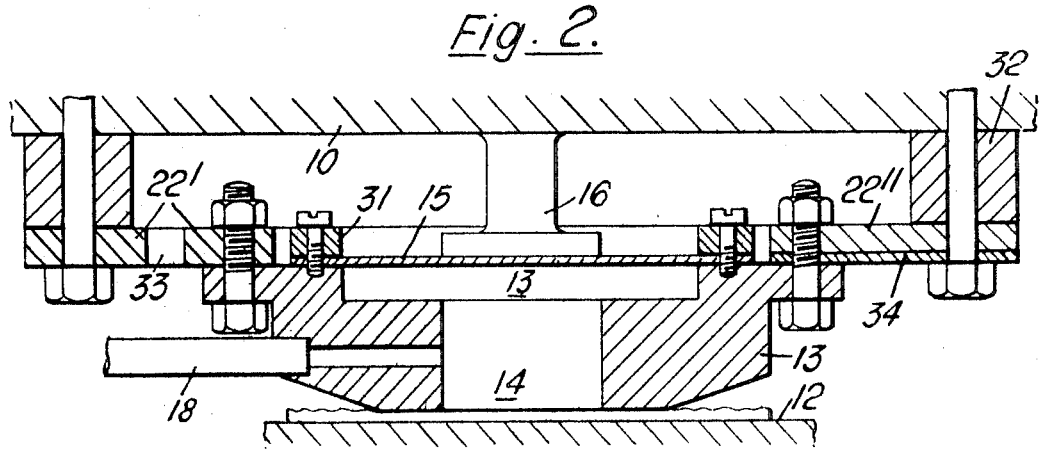

In the accompanying drawings,

FIG. 1 shows in partial section and somewhat schematic form by way of example a pressure-lubricated bearing in accordance with one embodiment of the invention, FIG. 2 shows the bearing of FIG. 1 in the form which it may take in practice, and FIGS. 3 to 5 shows further embodiments in the form of variants to that of FIG. 1.

In this arrangement (see FIG. 1) the weight of a load 10 is taken by first and second cooperating bearing surfaces 11 and 12. The load may be regarded as the worktable of a machine tool, the weight it imposes on the bearing being widely variable in dependence on the weights of the different workpieces to be machines.

Surface 11 is formed at the lowermost end of a pressure chamber 13 located between the load and surface 12, which constitutes part of a reference structure.

Chamber 13 has a port 14 which opens in surface 11. Remote from this port, the chamber is sealed at the top by a restrictor member in the form of a flexible metal diaphragm 15. Load 10 is rigidly coupled to the diaphragm by a pillar 16.

Oil from a source 17 of constant pressure is supplied to the chamber 13 by way of a pipe 18 which includes a restrictor or fluid resistance $18^1$, conveniently in the shape of a constricted passage as suggested by the drawing.

The chamber is resiliently coupled to a bracket 21, rigid with the load 10, by way of a spring device outside the chamber in the form of leaf springs 22.

The area A2 of diaphragm 15 is greater than the effective bearing area A1 lying within surface 11. This effective area is less than the overall area of surface 11 because the escaping oil falls in pressure between the port 14 and the outside atmosphere. In designing the bearing it is easy to calculate (from known data) an effective area over which the full oil pressure is assumed to exist.

In operation, oil from the source 17 is continuously delivered through the restrictor $18^1$ to chamber 13, to escape from its port 14 between surfaces 11 and 12 as a film 23 of thickness $h1$. Under stabilized conditions the combined stiffness of diaphragm 15 and springs 22 so determines the distance $h2$ between the load and the chamber that the distance H between the load and the reference surface 12 has the desired value.

Any appreciable addition to the load reduces the thickness $h1$ of the oil film. The corresponding increase in pressure of the oil in the chamber forces the diaphragm upwards and so increases the distance $h2$ between chamber and load. The combined stiffness of diaphragm 15 and springs 22 ensures that this increase of $h2$ equals the decrease of $h1$, with the desired overall result that the distance H is not appreciably affected. Conversely if the load is reduced.

Thus variations in the thickness of the oil film are compensated by opposite variations of the distance between the chamber and the load.

A numerical example may make the action clearer.

| | |
|---|---|
| Pressure of supply 17 | 500 p.s.i. |
| Effective area A1 of surface 11 | 2 sq. ins. |
| Effective area A2 of diaphragm 15 | 3 sq. ins. |
| Working range of load | 300 to 800 lbs. |

From the published characteristics of pressure-lubricated bearings, a load increase from 300 to 800 pounds is likely to decrease the thickness $h1$ of the oil film by about 0.001 in.

Over the above working range of the load, the pressure in chamber 13 increases from 150 to 400 p.s.i., and therefore the upward thrust on the diaphragm from 450 to 1,200 pounds.

A load increase of 500 accordingly increases the upward thrust on pillar 16 by 750 pounds—that is, an excess thrust of 250 pounds. This excess will deflect the diaphragm 15 upwards with respect to the chamber, thereby increasing the distance $h2$, until the combined stiffness of the diaphragm and springs 22 has developed an equal and opposite force of 250 pounds. This they must do by the time $h2$ has increased by 0.001 in. if the decrease in the value of $h1$ is to be precisely compensated and the distance H maintained constant.

Thus the total stiffness ("inch rate") of diaphragm and springs should be equal to 250/0.001=250,000 lbs./in.

In practice, arrangements are provided for adjusting the stiffness of springs 22 so that the final value can be attained by a simple process of trial and error. Two examples of convenient arrangements are described below with reference to FIG. 2.

As characteristic which relates load pressure to film thickness is somewhat curved, the compensation will not be exact unless the springs have a correspondingly nonlinear response; such approximate compensation, however, will be sufficiently close except over an excessive range of loads.

The actual form taken by the bearing may be as shown in FIG. 2, where the components which have already been described with reference to FIG. 1 are identified by their previous reference numbers.

The diaphragm 15 is secured in position by means of a clamping ring 31 coaxially surrounding pillar 16 and bolted to the upper surface of the chamber 13.

The inner ends of the leaf springs 22 are bolted to the chamber, from which they extend radially outwards for their outer ends to be secured to the load by way of a spacer ring 32 instead different bracket 21 of FIG. 1. Two of the prings are depicted at $22^1$ and $22^{11}$ to show two convenient ways of adjusting their compliance. Spring $22^1$ is made initially too strong, and its compliance is adjusted by drilling a hole 33 of appropriate radius through the spring. Spring $22^{11}$, on the other hand, is made too weak, and its compliance is adjusted by adding one or more additional and thinner springs 34. Each of these adjustments is accordingly somewhat coarse; but finer adjustments may be made by altering the resistance of the restrictor $18^1$ (FIG. 1) in the delivery pipe 18.

Various details of the embodiments described above with reference to FIGS. 1 and 2 may be varied within the scope of the invention.

For example, the diaphragm 14 of FIG. 1 may be replaced by a movable member in the form of a piston 41 (see FIG. 3) which traverses a part of the chamber 13 which acts as the cooperating cylinder. In such an arrangement the whole of the stiffness must be contributed by the springs 22.

Conversely, where the movable member is a resilient diaphragm 15 as first described, the whole of the stiffness may be in the diaphragm, and springs 22 dispensed with. This however is not usually a convenient alternative, since the stiffness of a diaphragm would normally be harder to adjust than that of exterior springs. Further, the springs perform the useful function of constraining the relative movement of chamber and load to the vertical.

In another alternative, see FIG. 4, the leaf springs 22 are replaced by a spring device outside the chamber in the form of coiled spring 42 coaxially surrounding the pillar 16 with the upper end of the coil engaging the load and the lower end engaging the rim of chamber 13. These ends of the coil need to be secured in those positions where the variations of the load are such as require the coil to be sometimes in tension.

As shown in much simplified form in FIG. 5, the chamber 13 may be in two parts, a main chamber 13A which contains the diaphragm 15 or piston 41 and an auxiliary chamber 13B which contains the port 14, the interiors of the two being put into communication with one another by a pipe 43. It is of course necessary for the two parts 13A and 13B to be rigidly connected to one another mechanically in order to transmit the thrust through to the supporting surface 12. Such a coupling is represented at 44.

The invention is not necessarily limited to the use of oil or other liquid as the pressure lubrication: a gas such as air may alternatively be used, provided that the appropriate modifications are made to the dimensions of the apparatus.

The invention is also applicable where the bearing is to resist thrusts other than gravitational and acting in directions other than the vertical.

What I claim is:

1. A pressure-lubricated bearing to support a load or resist a thrust due to a load which includes
   a. first and second cooperating bearing surfaces attached respectively to the load and to a reference structure and having a common area of overlap,
   b. a pressure chamber located between the second surface and the load and having a port which opens in the first surface in said common area, the chamber being sealed remote from the port over an area larger than that of said common area by a member movable to accept variations in the internal volume of the chamber,
   c. means rigidly coupling the load to said movable member,
   d. means for continuously delivering fluid under pressure to the chamber by way of a fluid resistance, thereby providing in operation a pressure reaction at said port and a film of fluid escaping from said port between said surfaces, and
   e. resilient means coupling the chamber to the load to compensate for variations in the thickness of said film by oppositely varying the distance between the chamber and the load to maintain the distance between the load and the second surface substantially constant.

2. A bearing as claimed in claim 1 wherein said movable member is a flexible diaphragm.

3. A bearing as claimed in claim 2 wherein the diaphragm has sufficient resilience to act as part at least of said resilient means.

4. A bearing as claimed in claim 1 wherein said movable member is a piston arranged to traverse a part of the chamber which forms the cooperating cylinder.

5. A bearing as claimed in claim 1 wherein part at least of said resilient means is in the form of a spring device outside the chamber.

6. A bearing as claimed in claim 1 wherein the pressure chamber comprises a main part containing said movable member, an auxiliary part having said port, and a pipe connecting the interiors of the two parts to one another.